3,437,697
LOW-FOAMING SURFACTANT COMPOSITIONS
John A. Hodgkiss, Edison, N.J., Joseph A. Komor, Allentown, Pa., and Leslie M. Schenck, Mountainside, N.J., assignors to GAF Corporation, a corporation of Delaware
No Drawing. Filed Sept. 10, 1965, Ser. No. 486,513
Int. Cl. C07c *43/12*
U.S. Cl. 260—615                                      4 Claims

ABSTRACT OF THE DISCLOSURE

Novel low-foaming surface active products having good detergency, which are the chlorides of nonionic surface active agents obtained by condensing 1 molar proportion of a branch chain alkanol of from 8 to 12 carbon atoms with from 6.75 to 23.6 molar proportions of ethylene oxide, said novel compounds having the formula:

$$R-(OCH_2CH_2)_nCl$$

wherein R represents a branched chain alkyl group containing from 8 to 12 carbon atoms, n is an integer having an average value of from 6.67 to 23.6 such that the oxyethylene groups constitute from 66.6% to 83.5% by weight thereof.

---

This invention relates to new and useful low-foaming surfactant (surface active) compositions and more particularly to compositions of low-foaming nonionic surfactants having branched hydrocarbon groups containing from 8 to 12 carbon atoms as hydrophobic groups and having the hydroxyl groups in the surfactant molecule replaced by chloride radicals.

Chlorides of a number of polyethoxylated aliphatic branch chain alcohols wherein the hydroxyl groups in the surfactant molecule have been replaced by chloride groups are known in the art and for example, are employed as intermediates in the synthesis of sulfonate or amine derivatives which are useful as surfactants. The chloride radical in these polyethoxylated alcohol derivatives are sufficiently reactive to form the desired sulfonates or amines. U.S. Patent 3,061,552 discloses that these chloride derivatives are also valuable as non-discoloring nonionic surfactants for use in the formulation of alkaline detergents or the like.

Methods for the preparation of polyethoxylated aliphatic alcohols useful in the synthesis of these chloride derivatives are described in U.S. Patents 1,970,578, 2,213,477, 2,575,832, 2,593,112, and 2,676,975. Usually, these polyethoxylated aliphatic alcohols are prepared by reaction of the desired aliphatic alcohol with the desired number of moles of ethylene oxide in the presence of a catalyst such as sodium hydroxide or the like. Methods for preparation of chloride derivatives of these polyethoxylated aliphatic alcohols are disclosed in U.S. Patents 2,249,111, 2,098,203, 2,097,441, 2,209,911, and 3,061,552. One general method for the preparation of these chloride derivatives involves reaction of 1 mole of thionyl chloride with 1 mole of the desired polyethoxylated aliphatic alcohol.

It is an object of this invention to provide new and useful low-foaming surfactant compositions containing chloride derivatives of polyethoxylated aliphatic alcohols in which the aliphatic alcohols contain a branched chain hydrocarbon radical as the hydrophobic moiety. Another object is to provide new and useful low-foaming detergent compositions of these chloride-containing surfactants. Other objects and advantages of this invention will appear as this description proceeds.

The objects of this invention are attained by our unexpected discovery that when 8 to 12 carbon atoms branched hydrocarbon chain alcohol ethoxylates containing from 66.6% to 83.5% of ethylene oxide by weight are converted into their corresponding chloride derivatives by replacement of the hydroxyl groups in the surfactant molecule with chloride radicals the resulting nonionic surfactants are valuable as low-foaming nonionic surfactants. The compounds of this invention are characterized by the following formula:

$$R-(OCH_2CH_2)_nCl$$

wherein R represents a branched chain alkyl group having from 8 to 12 carbon atoms or mixtures of such alkyl groups and n is a positive integer having an average value of 6.75 to 23.60 and which is of such magnitude as to incorporate from 66.6% to 83.5% ethylene oxide by weight into the surfactant molecule.

Hydrocarbon (branch chain) alcohols may be obtained by any conventional alcohol for synthesis methods. One of the most common ways for producing these alochols is by the well known Oxo process which involves catalytic reaction of aliphatic olefins, carbon monoxide, and hydrogen under pressure to give primary aliphatic alcohols having branched chain. These aliphatic olefins are often olefins such as dimers, trimers, tetramers, and pentamers of mono-olefins such as isopropylene, isobutylene or the like. Polyolefins which may be employed in the Oxo process include tripropylene, tetrapropylene, pentapropylene, propylene-isobutylene, tri-isobutylene and tetra-isobutylene. Alcohols obtained from the Oxo process are mixtures and may be used in this form. These mixtures may also be separated to obtain individual members and these individual members used. Such Oxo alcohol mixtures include those of isooctyl alcohols, decyl alcohols, tridecyl, alcohols, pentadecyl alcohols or heptadecyl alcohols, or the like.

Nonionic surfactants employed in this invention are prepared by reaction of ethylene oxide, ethylene chlorihydrin or the like with the desired branched chain alcohol. Such nonionic surfactants employed in this invention are described in U.S. Patents 1,970,578, 2,213,477, 2,575,832, 2,593,112, and 2,676,975. The complete description and teachings of these patents are incorporated herein by references.

The foaming characteristic of these surfactants are evaluated by the "Hamilton Beach Foam Test." This test involves placing 200 ml. of an aqueous solution containing 0.1% of the surfactant to be tested in a thermo-regulated baffled test cell heated to the desired test temperature. This solution is agitated for three minutes in the test cell using a standard Hamilton Beach milk shake mixer. At the end of the three minutes agitation is stopped and the height of foam is measured after five seconds and reported in centimeters. This test simulates the foaming obtained in systems where high speed agitation is used.

The Draves wetting test is used to measure the wetting properties of the surfactants. Details of this test are given in the American Dyestuff Reporter, 20,201 (1931) and American Dyestuff Reporter, 28,421 (1939). In the Draves test the concentration of surfactant required to give a wet-out time of 25 seconds at 25° C is determined. Briefly, this test involves submerging a five gram skein of gray cotton yarn in the test solution by means of a weight. As the solution wets the yarn, air is progressively displaced and the bouyancy of the skein decreases until at the end point of the test, the skein sinks. The time in seconds required to reach the endpoint is recorded. By successive adjustments in the concentration of the test solution a 25 second wetting endpoint is obtained.

The precent biodegradability of surfactants is determined by the Warburg Respirometer Technique. The percent biodegradability of the surfactant being tested is compared to that obtained with linear alkyl benzene sulfonate taken as 100%. This test involves determination of the amount of oxygen utilized in a Warburg Respirometer by micro-organisms in oxidizing the surfactant being tested in accordance with the procedure outlined by Henkelstein and Rand in "Sewerage and Industrial Waste," vol. 27, No. 9, September 1955. The cloud point of the surfactant is determined by measuring the temperature at which a 1% aqueous solution clouds when the solution is heated.

The following examples are illustrative of preferred embodiments of the present invention. These examples are only illustrative of the invention and are not to be regarded as limitative. It is to be understood that all parts, percentages and proportions referred to herein and in the appended claims are by weight unless otherwise indicated. All references as to temperatures are to ° C.

EXAMPLE I

A total of 58 parts of thionyl chloride is added over a two-hour period at 50–55° C. to 250 parts of a polyglycol monoether obtainend by conventional condensation of a branched chain Oxo decyl alcohol with 10 moles of ethylene oxide. Following the addition, the charge is heated to 100° C. over a two hour period and held at this temperature for four hours. Excess thionyl chloride and hydrogen chloride are removed by vacuum stripping the reaction mixture at 100° C. for two hours. The surfactant obtained by this procedure has the following properties.

| | |
|---|---|
| Cloud point, 1% aqueous solution ° C | 30 |
| Hamilton Beach Foam at 60° C., 0.1% surfactant, corrected to 5 sec. value cm | 0.7 |
| Draves Wetting at 25° C. Concentration required for 25 second wet-out time percent | 0.062 |
| Percent biodegradability by Warburg Respirometer Technique compared with linear alkylbenzene sulfate as 100% percent | 23 |

EXAMPLE II

Example I is repeated with the exception that 242 parts of a polyglycol monoether of iso-octyl alcohol with 10 moles of ethylene oxide is substituted for 250 parts of a branched chain Oxo-decyl alcohol ethoxylate. The surfactant obtained by this procedure has the following properties.

| | |
|---|---|
| Cloud point, 1% aqueous solution ° C | 45 |
| Hamilton Beach Foam at 60° C., 0.1% surfactant, corrected to 5 sec. value cm | 0.0 |
| Draves Wetting at 25° C. Concentration required for 25 second wet-out time percent | 0.142 |
| Percent biodegradability by Warburg Respirometer Technique compared with linear alkylbenzene sulfate as 100% percent | 18 |

EXAMPLE III

Example I is repeated with the exception that 183 parts of a polyglycol monoether of 2-ethyl hexyl alcohol with seven moles of ethylene oxide is substituted for 250 parts of a branched chain Oxo decyl alcohol ethoxylate. The surfactant obtained by this procedure has the following properties.

| | |
|---|---|
| Cloud point, 1% aqueous solution ° C | <0 |
| Hamilton Beach Foam at 60° C., 0.1% surfactant, corrected to 5 sec. value cm | 0.0 |
| Draves Wetting at 25° C. Concentration required for 25 second wet-out time percent | .140 |
| Percent biodegradability by Warburg Respirometer Technique compared with linear alkyl benzene sulfate as 100% percent | 16 |

EXAMPLE IV

Example I is repeated with the exception that 320 parts of a polyglycol monoether of 2,3-dimethylhexanol with 14.5 moles of ethylene oxide is substituted for 250 parts of a branched chain Oxo decyl alcohol ethoxylate. The surfactant obtained by this procedure has the following properties.

| | |
|---|---|
| Cloud point, 1% aqueous solution ° C. (turbid) | 30 |
| Hamilton Beach Foam at 60° C., 0.1% surfactant, corrected to 5 sec. value cm | 8.9 |
| Draves Wetting at 25° C. Concentration required for 25 second wet-out time percent | 0.29 |
| Percent biodegradability by Warburg Respirometer Technique compared with linear alkyl benzene sulfate as 100% percent | 9 |

EXAMPLE V

Example I is repeated with the exception that 455 parts of a polyglycol monoether of 4-methyl-6-ethyl nonanol with 20 moles of ethylene oxide is substituted for 250 parts of a branched chain Oxodecyl alcohol ethoxylate. The surfactant obtained by this procedure has the following properties.

| | |
|---|---|
| Cloud Point, 1% aqueous solution ° C | >100 |
| Hamilton Beach Foam at 60° C., 0.1% surfactant, corrected to 5 sec. value cm | 8.4 |
| Draves Wetting at 25° C. Concentration required for 25 second wet-out time percent | 0.27 |
| Percent biodegradability by Warburg Respirometer Technique compared with linear alkylbenzene sulfate as 100% percent | 16 |

EXAMPLE VI

Example I is repeated with the exception that 260 parts of a polyglycol monoether of 2,4,6-trimethylnonanol with 10 moles of ethylene oxide is substituted for 250 parts of branched chain Oxodecyl alcohol ethoxylate. The surfactant obtained by this procedure has the following properties.

| | |
|---|---|
| Cloud Point, 1% aqueous solution ° C | 25 |
| Hamilton Beach Foam at 60° C., 0.1% surfactant, corrected to 5 sec. value cm | 9.4 |
| Draves wetting at 25° C. Concentration required for 25 second wet-out time percent | 0.39 |
| Percent biodegradability by Warburg Respirometer Technique compared with linear alkylbenzene sulfate as 100% percent | 3 |

EXAMPLE VII

The low-foaming detergent of Example I is formulated by mixing 5% by weight with 95% of a builder consisting of one part sodium metasilicate with three parts of sodium tripolyphosphate. The foaming property of the product is tested by the use of a Kitchen Aid dishwashing machine. This machine consists of a rotating arm through which the detergent solution is pumped, the revolutions per minute of the arm which can be measured easily is dependent on the amount of foam produced from the solution, so that an excess of foam will stop the machine. Consequently, a decrease in r.p.m. signifies an increase in foam. The surfactant obtained by this procedure has the following properties.

Mechanical dishwashing evaluation
(Tap water temperature at 140° F. Product conc. 0.25%)

| Surfactant: | Foam r.p.m. of agitator |
|---|---|
| Builders alone | 90 |
| Calgonite (as is) | 80 |
| Branched chain decyl alcohol plus 10 E.O. chloride | 83 |

These results show the detergent compounded with the surfactant described in Example I is superior to the commercial machine dishwashing detergent. Comparable results are obtained in formulations containing 0.05% and 10% (by weight) of this surfactant and the surfactants of Examples II to VI.

These novel chlorides of polyethoxylated alkanols having branched chain alkyl groups containing from 8 to 12 carbon atoms or mixtures of such alkyl groups and containing from 66.6% to 83.5% ethylene oxide by weight and having values of $n$ from 6.75 to 23.6 are useful as low-foaming surfactants in numerous applications. Such applications include use of these surfactants as detergents, emulsifying agents, wetting agents, demulsifying agents, defoaming agents or the like in products such as low-foaming laundry detergents, machine dishwashing compounds, rinse aids, emulsifying agents for use in metal cleaning, metal cutting, dye levelling, petroleum demulsifying, textile processing, water treating, pharmaceuticals, adhesives, paint pigment dispersants, general defoaming applications or the like. These chlorides are particularly well suited for use as formulated detergents with builders and the like for use in automatic and other types of power cleaning equipment where foaming is a problem. They are also useful as emulsifying agents in the formulation of emulsion cleaners for use in spray type cleaning equipment. These products may be used as wetting agents and penetrants for biocidal formulations particularly where these formulations are applied as high pressure sprays or as aerial sprays. The products may also be used as dedusting and conditioning agents for detergent compositions. They may also be used as aids in textile, paper and leather processing.

This invention has been disclosed with respect to certain preferred embodiments. Various modifications and variations thereof will become obvious to persons skilled in the art. It is to be understood that such modifications and variations are to be included within the spirit and scope of this invention.

What is claimed is:

1. A low-foaming nonionic chloride surfactant composition having the formula:

$$R\!-\!(OCH_2CH_2)_nCl$$

wherein R represents a branched chain alkyl group containing from 8 to 12 carbon atoms, $n$ is an integer having an average value of from 6.75 to 23.6 such that the oxyethylene groups constitute from 66.6% to 83.5% by weight thereof.

2. A surfactant composition as defined in claim 1 wherein the nonionic surfactant is a branched chain Oxo-decyl alcohol derivative containing 10 oxyethylene groups.

3. A surfactant composition as defined in claim 1 wherein the nonionic surfactant is an iso-octyl alcohol derivative containing 10 oxyethylene groups.

4. A surfactant composition as defined in claim 1 wherein the nonionic surfactant is a 2-ethyl hexyl alcohol derivative containing seven oxyethylene groups.

References Cited

UNITED STATES PATENTS 2,817,686 12/1957 Cicero et al.
3,061,552 10/1962 Schenck et al.
3,294,847 12/1966 Albright et al.

FOREIGN PATENTS 1,057,814 11/1953 France.

LEON ZITVER, *Primary Examiner.*

HOWARD T. MARS, *Assistant Examiner.*

U.S. Cl. X.R.

8—14, 137; 106—277, 308; 252—79.5, 89, 135, 156, 175, 311, 351; 424—342